No. 641,731. Patented Jan. 23, 1900.
W. R. SALISBURY.
CULTIVATOR.
(Application filed Mar. 27, 1899.)
(No Model.)
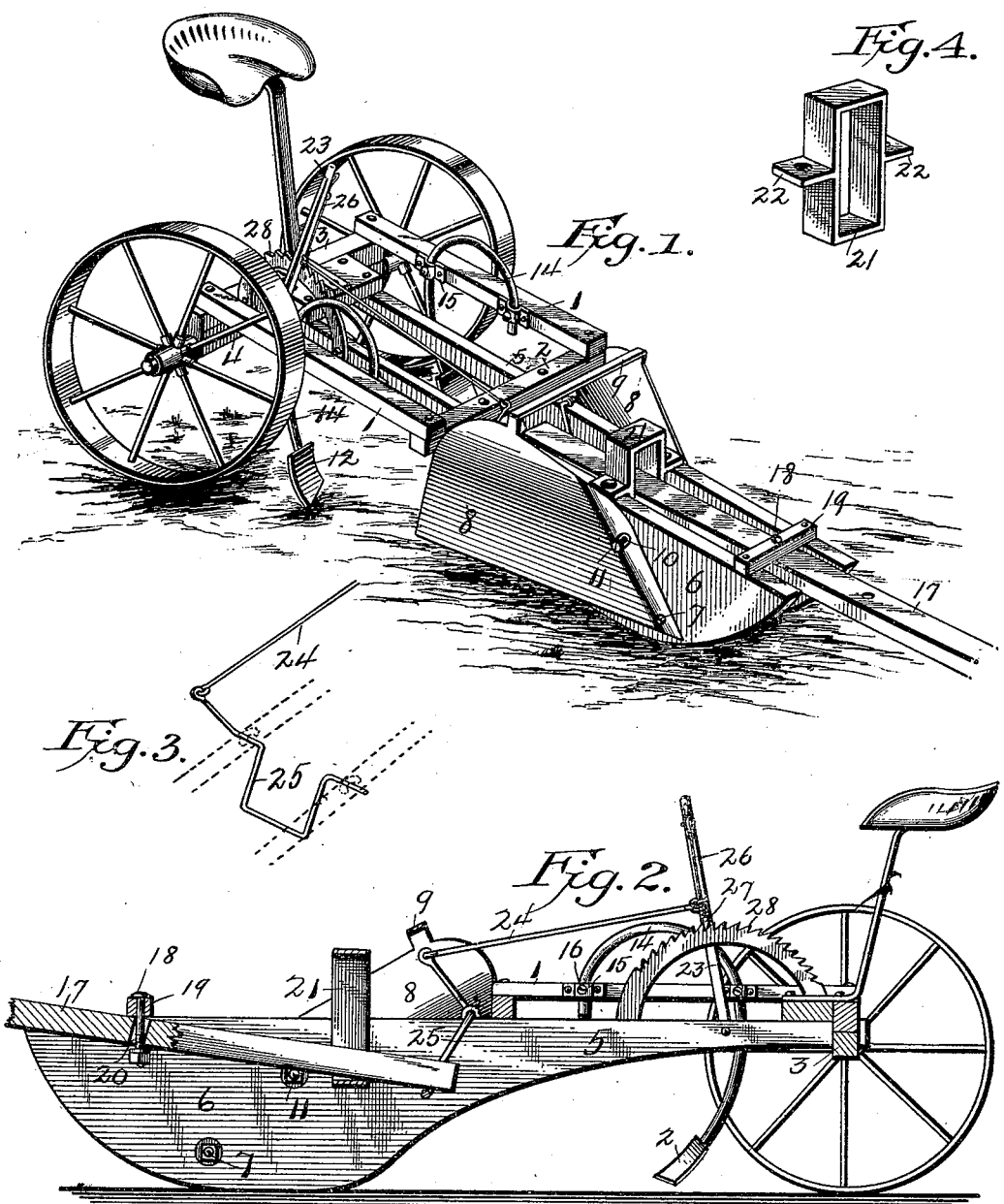

UNITED STATES PATENT OFFICE.

WILLIAM R. SALISBURY, OF LAMONI, IOWA.

CULTIVATOR.

SPECIFICATION forming part of Letters Patent No. 641,731, dated January 23, 1900.

Application filed March 27, 1899. Serial No. 710,605. (No model.)

*To all whom it may concern:*

Be it known that I, WILLIAM R. SALISBURY, a citizen of the United States, residing at Lamoni, in the county of Decatur and State of Iowa, have invented certain new and useful Improvements in Cultivators; and I do hereby declare the following to be a full, clear, and exact description of the invention, such as will enable others skilled in the art to which it appertains to make and use the same.

This invention relates to certain new and useful improvements in cultivators.

The invention relates more particularly to that class of cultivators known as "lister" cultivators, which are usually of the wheeled type and are adapted to straddle a row of corn or other plants around which it is desired to embank the earth.

One of the objects of my invention is to construct a cultivator of this class which will be extremely simple in its construction, strong, durable, effectual in its operation, and comparatively inexpensive to manufacture.

Another important object of the invention is to provide means for shifting the weight of the cultivator when desired to the rear of the same in order that the turning of the same at the end of a row may be easily accomplished.

A further object of my invention is to construct a cultivator of this class having a pair of adjustable moldboards and so arranged as to cut and turn the top of the soil and weeds, and thereby allow the adjustable shovels arranged at the rear of the adjustable moldboards and at a reverse incline thereto to engage the clean soil and embank the same around the corn or other plants.

Briefly described, therefore, my invention consists in a pair of adjustable moldboards, a pair of adjustable shovels, together with a pair of runners, and a suitable carriage for the aforementioned parts, together with means carried by the carriage for operating the tongue so as to shift the weight to the rear of the cultivator when desired to turn the same.

The invention finally consists in the novel construction, combination, and arrangement of parts to be hereinafter more specifically described and then particularly pointed out in the claims.

In describing the invention in detail reference will be had to the accompanyings, forming a part of this specification and wherein like letters of reference will indicate similar parts throughout the several views, in which—

Figure 1 is a perspective view of my improved cultivator. Fig. 2 is a longitudinal sectional view of the same. Fig. 3 is a perspective view of a portion of the tongue-operating mechanism, also showing a portion of the runners in dotted lines. Fig. 4 is a perspective view of the keeper in which the rear end of the tongue operates.

To put my invention into practice, I provide a suitable frame which may be composed of several pieces, or this frame may be cast in one piece, as may be desired, though in the illustration of my invention I have shown the same as consisting of the side rails 1, which at their forward ends are connected to a cross-piece 2 and at their rear ends to a similar cross-piece 3, the latter being mounted upon and rigidly secured to the axle 4. The cross-piece 2 is rigidly bolted or otherwise secured to the runners 5, these latter being supported at their rear ends by the axle 4 and having their forward ends enlarged or swelled, as shown at 6, which portion is adapted to contact with the soil. The front ends of the runners are preferably rounded, as shown, to permit their readily passing over any obstruction. These runners have pivotally attached to their outer faces, by means of bolts 7 or other suitable means, the moldboards 8, which taper downwardly on the forward end thereof and also project outwardly from the runners in order that when the soil is cut thereby it may also be turned over in the same manner as is accomplished by an ordinary plow-moldboard. These tapering moldboards are connected together at their upper edge near the rear ends by means of a connecting-bar 9, and they are made adjustable in order that they may be made to conform to an even surface or to furrowed ground. This adjustment of the moldboards is accomplished by providing each with an oblong aperture 10, which is countersunk to receive the head of the securing-bolt 11, which engages the runner 6. The head of this bolt is countersunk in order that the same may not extend beyond the outer face of the moldboard. When this bolt is loosened, it will be observed that the moldboards may be adjusted to the position desired, and when the bolt is tightened it will hold the moldboards in this adjusted position.

In order to embank the soil around the row of corn-plants, I provide a pair of adjustable shovels 12, which are inclined inwardly and are rigidly secured on the lower ends of the adjustable supporting-rods 14. These supporting-rods are curved, as shown, in order that the shovels may be adjusted to engage the soil to any desired depth, and the rods are supported and retained in the desired position by means of keepers 15, secured to the inner face of each of the side rails 1 and having arranged therein set-screws 16, the inner ends of which contact with the supporting-rods. By loosening these set-screws the supporting-rods may be operated within their keepers, so as to adjust the shovels in the desired manner.

The tongue 17 is supported by a king-bolt 18, engaging the same and a cross-piece 19, rigidly secured to the upper face of the runners near their forward ends. The aperture 20 in the tongue for the reception of this king-bolt is made larger than the diameter of the king-bolt in order to permit the vertical movement of each end of the tongue. The rear end of the tongue operates in a guide or keeper 21, oblong in form, and having two side lugs 22, by means of which the same may be rigidly secured to the upper face of the runners 6. For the purpose of obtaining a leverage against the rear end of this tongue and by this means shifting the weight of the cultivator to the rear thereof in order to facilitate turning I pivotally connect to one of the runners a lever 23, which has attached thereto the one end of a rod 24. The other end of this rod 24 is pivotally connected to the upwardly-extending end of the bell-crank 25, which is journaled in or supported by the runners at a point at or near the end of the tongue. This bell-crank engages underneath the tongue and when the lever 23 is pulled backwardly raises the rear end of the tongue, drawing down the forward end thereof, and consequently throwing or shifting the weight of the cultivator to the rear part thereof. For the purpose of retaining the tongue in this position I attach to the lever 23 a spring-actuated rod 26, carrying in its lower end a pawl 27, adapted to engage the segment-shaped rack 28, which may be secured either to the runner or to one of the side rails. By this arrangement and construction it will be observed that when the weight is thus shifted upon the wheels of the cultivator the moldboards, which constitute the plow, will be elevated, and the cultivator may be turned at the end of the row without these moldboards injuring the plants.

By the arrangement of the moldboards preceding the shovels the top of the soil, together with weeds or obstructions, is removed in order that the reversely set or inclined shovels may engage the fresh and clean soil and throw the same around the plants in the desired manner.

While the construction as herein shown and described appears to embody the preferable form of my invention, yet I do not wish to unduly limit myself thereto, but desire the right to make such changes as the omission or addition of parts or the substitution of equivalents therefor as would clearly come within the scope of my invention.

Having now fully described my invention, what I claim as new, and desire to secure by Letters Patent, is—

1. In a cultivator of the class described, the combination of a frame, a supporting-truck, a pair of runners rigidly connected to said truck, a pair of moldboards adjustably connected to said runners with their lower edge inclined outwardly and having their forward ends tapering downwardly, and a pair of adjustable shovels carried by said frame and set at a reverse incline to the adjustable moldboards, substantially as described.

2. In a cultivator of the class described, the combination of a frame, a pair of runners rigidly connected to said frame, a pair of moldboards adjustably connected to said runners and having their forward ends tapering downwardly, an adjustable tongue, and means carried by said frame for adjusting said tongue, substantially as described.

3. In a device of the character described, the combination of a frame, a pair of adjustable shovels carried by said frame, a pair of runners connected to the frame, a pair of adjustable moldboards connected together and supported from said runners, said moldboards having their forward ends tapering downwardly and their lower edge inclined outwardly, an adjustable tongue, a keeper connected to said runners and adapted to receive the rear end of said tongue, a lever pivotally connected to one of said runners, and a bell-crank journaled in the runners and connected to said lever and adapted to engage said tongue for operating the same, substantially as described.

In testimony whereof I affix my signature in presence of two witnesses.

WILLIAM R. SALISBURY.

Witnesses:
E. J. ROBINSON,
GEO. T. WILLIS.